April 6, 1926.　　　　　　　　F. E. TOBIN　　　　　　1,579,580
REGISTERING DEVICE
Filed Dec. 29, 1922
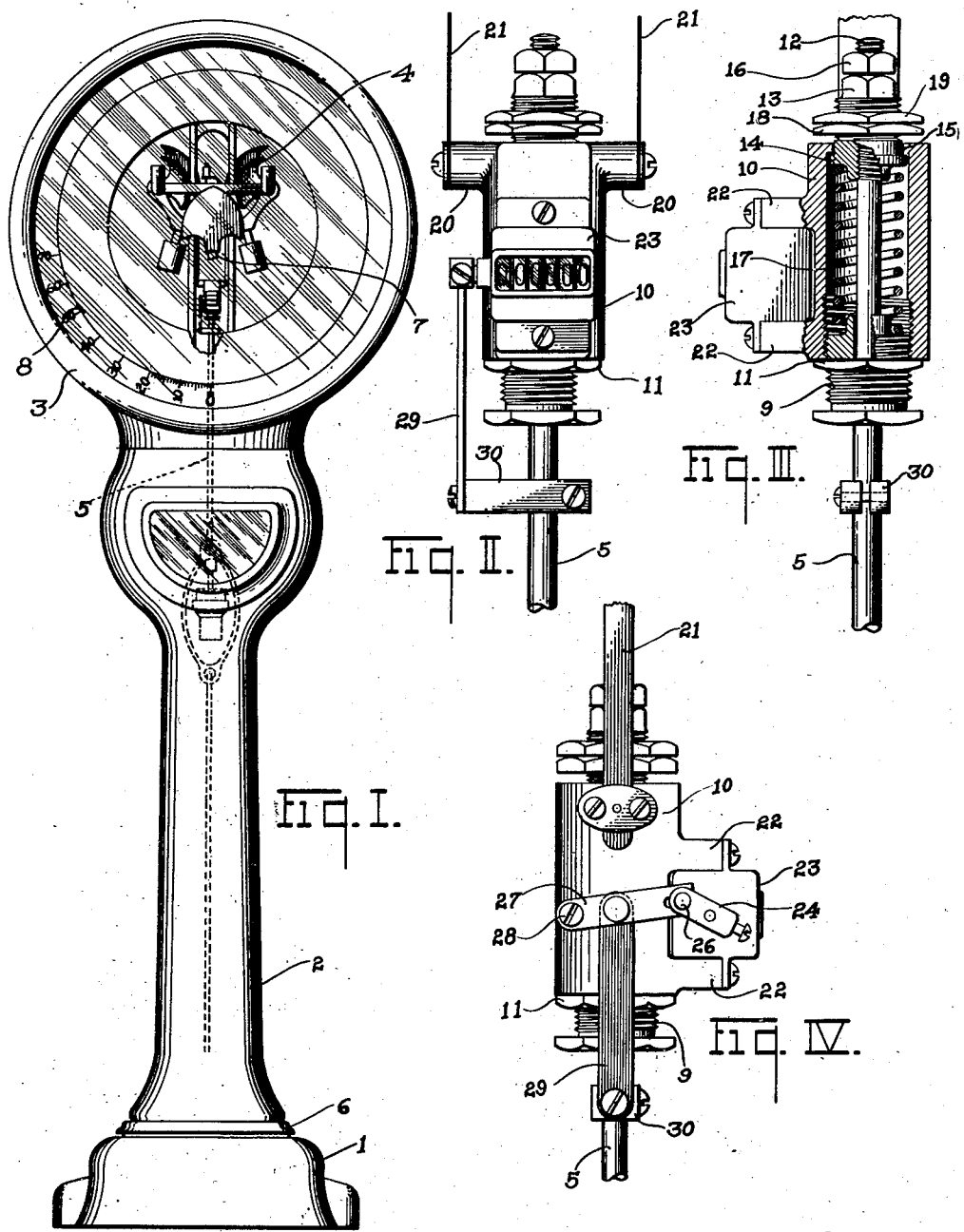
Inventor
FLOYD E. TOBIN
By　C. C. Marshall
　　　　Attorney Patented Apr. 6, 1926.

1,579,580

UNITED STATES PATENT OFFICE.

FLOYD E. TOBIN, OF TOLEDO, OHIO, ASSIGNOR TO TOLEDO SCALE COMPANY, OF TOLEDO, OHIO, A CORPORATION OF NEW JERSEY.

REGISTERING DEVICE.

Application filed December 29, 1922. Serial No. 609,682.

*To all whom it may concern:*

Be it known that I, FLOYD E. TOBIN, a citizen of the United States, residing at Toledo, in the county of Lucas and State of Ohio, have invented certain new and useful Improvements in Registering Devices, of which the following is a specification.

This invention relates to combined weighing scales and registering devices, and is an improvement on the broad invention disclosed in the application of Edward G. Thomas, Ser. No. 473,100, filed May 27, 1921.

One of the principal objects of the invention is to so design the registering device that its parts may be made largely of ordinary stock materials by simple screw machine operations.

Another object is to so construct the registering device as to facilitate its assembly with the weighing scale mechanism.

And still another object is to provide for quick and accurate adjustment of the several co-operating parts of the device.

Other objects and advantages will be apparent from the following description, in which reference is had to the accompanying drawings illustrating a preferred embodiment of my invention and wherein similar reference numerals designate similar parts throughout the several views.

In the drawings:

Figure I is a front elevation of a weighing scale embodying my invention, part of the indicating hand and part of the chart being broken away to show the registering device;

Figure II is a front elevation on an enlarged scale showing the registering device;

Figure III is a side elevational view taken from the right of Figure II, parts being broken away; and Figure IV is a side elevational view taken from the left of Figure II.

The weighing scale illustrated is of the person weigher type having a base 1 upon which stands a column 2 surmounted by a substantially watch-case-shaped housing 3 which contains the automatic load-counterbalancing mechanism 4 that is connected by means of a steelyard rod 5 to base lever mechanism (not shown) which supports a platform 6 overlying the base 1. When a person steps upon the platform 6 the steelyard rod 5 is pulled downwardly, thus actuating the load-counterbalancing mechanism so that the weight of the person on the platform is indicated by means of a hand 7 (a part of which is broken away in Figure I) upon a chart 8.

It has been discovered, as set forth in the above-mentioned copending application of Thomas, that the connection 5 between the platform lever mechanism and the automatic load-counterbalancing mechanism 4 may be made slightly extensible without affecting the accuracy of the scale and that the relative movement of two parts of the extensible connection may be utilized to operate a counter or register. In the form of device disclosed herein the steelyard rod 5 passes loosely through a threaded plug 9 which is screwed into an internally threaded bore in a casting 10 and locked in place by means of a lock nut 11. The upper end of the steelyard rod 5 is threaded, as shown at 12, and is provided with a threaded fitting 13, at the lower end of which is formed a collar 14 which lies within the bore in the casting 10 and is adapted to engage an inwardly extending annular lip 15 at the upper end of the bore. The fitting 13 is locked in place upon the steelyard 12 by means of a lock nut 16.

Interposed between the upper end of the plug 9 and the collar 14 at the lower end of the fitting 13 is an expansive coil spring 17 which normally holds the collar 14 in engagement with the lip 15. The steelyard rod 5 with the fitting 13 may, however, be moved downwardly relatively to the casting 10 by compressing the spring 17. The extent to which the rod 5 may be moved relatively to the casting 10 is limited by means of a stop nut 18 which is threaded on the fitting 13 and held in place by a lock nut 19.

Formed at the upper end of the casting 10 is a pair of laterally extending lugs 20, and connected to the lugs 20 is a pair of flexible steel bands or ribbons 21, the upper ends of which are connected to the automatic load-counterbalancing mechanism of the scale, which I have shown as of the well known type shown and described in the patent to Hapgood No. 1,203,611.

The casting 10 is also provided with a pair of forwardly projecting lugs 22, to which is secured a counter or registering device 23 of the Veeder type. The counter 23 is operated by means of a rock arm 24 which is connected by a pin-and-slot connection 26 to a lever 27 pivotally mounted, as at 28, on the casting 10. The lever 27 is operated by a link 29 which connects the lever with a laterally extending member 30 which is clamped to the steelyard 5.

When a person steps on the platform 6 of the scale and the steelyard rod 5 is pulled downwardly, the spring 17 is compressed and the rod 5 moves downwardly relatively to the casting 10, thus pulling downwardly on the link 29 which swings the lever 27 and rocking arm 24 about their pivots and operating the register 23. The pull on the ribbons 21 is, paradoxical as it may seem, just as great as it would be if there were no relative movement of the steelyard rod 5 and the casting 10, so that the accuracy of the scale is not impaired. A very slight movement of the rod 5 relative to the casting 10 serves to operate the register 23 and, in order to prevent the lever 27 from being swung through too great an arc, the movement of the rod 5 relative to the casting 10 is limited by means of the stop nut 18 which engages the top of the casting. When the person steps off the platform, the spring 17 expands and returns the parts to their initial positions, thus re-setting the register.

The tension of the spring 17 may be lessened by partially backing the plug 9 out of the bore in the casting 10, and the tension of the spring may be increased by turning the plug further into the bore. The steelyard rod may be lowered or raised by turning the fitting 13 on the upper end of the rod. The length of the stroke may be regulated by properly positioning the stop nut 18 and the initial positions of the lever 27 and rocking arm 24 are governed by the position on the rod 5 of the laterally extending member 30, which may be clamped in any desired position on the rod.

It will be observed that I have replaced the member usually employed to connect the upper end of the steelyard rod with the flexible metallic ribbons with a registering device of simple and compact construction, most of the parts of which are adapted to be made from commercial stock by ordinary screw machine operations, the structure of the device being such that it is easily assembled in the scale and such that all necessary adjustments may be easily and quickly made.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, load-counterbalancing mechanism, a steelyard rod, a member connected to said load-counterbalancing mechanism and having a bore therein receiving the upper end of said steelyard rod, a plug adjustably mounted in one end of said bore, a collar on said rod in the other end of said bore, a spring interposed between said plug and said collar, a register mounted on said member, and operating connections between said steelyard rod and said register.

2. In a device of the class described, in combination, load-counterbalancing mechanism, a steelyard rod, a member connected to said load-counterbalancing mechanism and having a bore receiving the upper end of said steelyard rod, a plug adjustably mounted in the lower end of said bore, a fitting on the upper end of said steelyard rod within the upper end of said bore, movement limiting means adjustably mounted on said fitting, a register mounted on said member, and adjustable operating means connecting said steelyard rod and said register.

3. In a device of the class described, in combination, automatic load-counterbalancing mechanism, a pair of flexible connections depending therefrom, a steelyard rod, a member fastened to said flexible connections and having a bore receiving the upper end of said steelyard rod, a plug surrounding said steelyard rod and adjustably mounted in the lower end of said bore, a fitting adjustably secured on said steelyard rod and extending into the upper end of said bore, a stop nut adjustably mounted on said fitting, a register mounted on said member, a link operatively connected to said register, and adjustable means connecting said link to said steelyard rod.

FLOYD E. TOBIN.